United States Patent
Redel et al.

[15] 3,676,499
[45] July 11, 1972

[54] PROCESS OF PREPARING PHYTONE

[72] Inventors: Joseph Redel, Antony; Jean Baptiste Christian Boch, Neris Les Bains, both of France

[73] Assignee: A.E.C. Societe de Chimie Organique et Biologigque, Commentry, France

[22] Filed: Oct. 31, 1968

[21] Appl. No.: 772,285

Related U.S. Application Data

[63] Continuation-in-part of Ser. No. 482,681, Aug. 26, 1965, abandoned.

[30] Foreign Application Priority Data

Sept. 3, 1964 France..................................64986944

[52] U.S. Cl..........................260/593 R, 260/594, 260/615, 260/601
[51] Int. Cl.....................................C07c 49/20, C07c 49/06
[58] Field of Search..............................260/593 R

[56] References Cited

UNITED STATES PATENTS 2,957,027 10/1960 Beets et al..........................260/593 R

OTHER PUBLICATIONS

Chemical Abstracts Vol. 68 Subject Index January– June. (1968) page 2937S.

*Primary Examiner*—Daniel D. Horwitz
*Attorney*—Young & Thompson

[57] ABSTRACT

Phytone is prepared from citral or pseudo-ionone by conversion thereof into a $C_{14}$-pseudo-acetal or 7,11-dimethyl-4,6,10-dodecatriene-1,1-lower-dialkyoxy-3-one, reaction of this acetal with a methylmagnesium halide to a $C_{15}$-pseudo-hydroxy-acetal, hydrolysis of the latter into the corresponding aldehyde which is condensed with acetone to the $C_{18}$-pseudo-ketone, and catalystic hydrogenation of the latter.

2 Claims, 2 Drawing Figures

INVENTORS
JOSEPH REDEL
JEAN BAPTISTE CHRISTIAN BOCH
BY Young & Thompson
ATTYS.

PROCESS OF PREPARING PHYTONE

This application is a continuation-in-part of application Ser. No. 482,681 filed Aug. 26, 1965, now abandoned.

Figure 1:
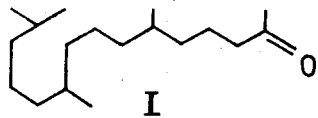

The present invention relates to the preparation of phytone (I), ketone having the empirical formula $C_{18}H_{36}O$ and the structural formula illustrated in FIG. 1 of the accompanying drawing.

Phytone is of high interest since it constitutes an appreciated intermediary, inter alia, in the synthetic preparation of isophytol and vitamins E and $K_1$.

A number of processes are already known for the synthetic preparation of phytone.

These known processes have drawbacks in that they start with expensive and rare materials, require a great number of operating stages, give poor yields or suffer from two or more of these defects.

The object of the invention is to remedy these drawbacks. The invention provides for this purpose an improved process for preparing phytone either in starting with citral or an equivalent amount of lemongrass oil, or in starting with pseudo-ionone which are readily available and relatively inexpensive products.

This process affords an entirely new way to phytone through a series of new intermediate products.

Figure 2:
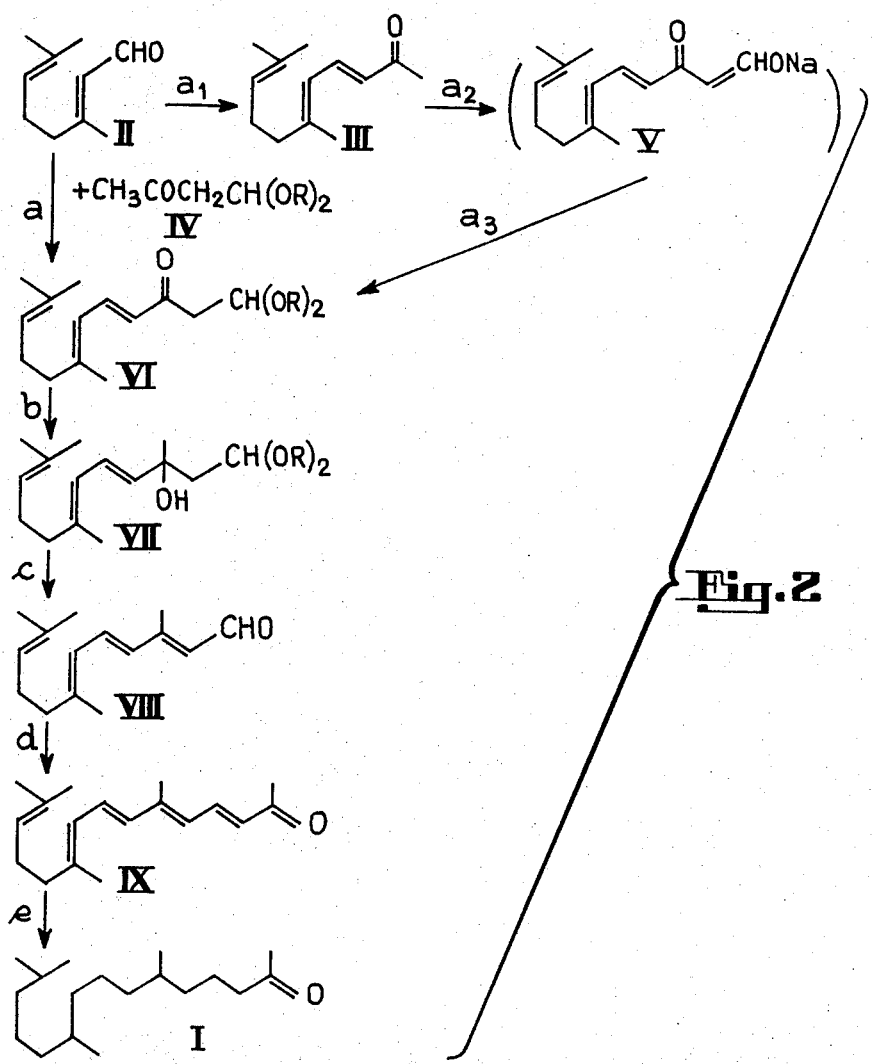

FIG. 2 of the accompanying drawing illustrates the whole of the synthetic preparation of phytone (I) from citral (II) or pseudo-ionone (III) according to the invention.

This synthetic preparation comprises the preliminary preparation of a $C_{14}$-pseudo-acetal (VI), R being a lower alkyl group and singularly methyl that is to say, of a 7,11-dimethyl-4,6,10-dodecatriene-1,1-lower dialkoxy-3-one.

The compounds (VI) are new. They are prepared from citral (II) by condensation of the latter according to stage (a) with an acetal of β-ketobutyraldehyde (IV).

This condensation is advantageously effected in an anhydrous medium in the presence of an alkali metal alkoxide of a lower alkanol at a temperature between about −30° C and +10° C, preferably between about −20° C and −10° C. A number of anhydrous organic solvents can be used as reaction medium, such as dialkyl ethers, hydrocarbons and chlorinated hydrocarbons.

To obtain the compounds (VI) from pseudo-ionone (III) which can be obtained in the conventional manner by condensation of citral (II) with acetone (stage $a_1$), the pseudo-ionone is formylated according to Claisen's method so as to obtain according to stage ($a_2$) the enolate (V) which is directly acetalized (stage $a_3$) into compound (VI).

More specifically, stages ($a_1$), ($a_2$) and ($a_3$) can be carried out as follows.

In stage ($a_1$), an excess of acetone is used as solvent and the condensation with citral is effected in alkaline medium at a temperature between about 20° C and the reflux temperature of the reaction medium.

To formylate pseudo-ionone (stage $a_2$), the latter is contacted with a lower alkanol formate in an anhydrous medium in the presence of an alkali metal alkoxide of a lower alkanol at a temperature between about 0° C and 30° C, preferably between about 15° and 25° C. A number of anhydrous organic solvents can be used as reaction medium, such as hydrocarbons and dialkyl ethers.

The enolate (V) is acetalized (stage $a_3$) by means of a lower alkanol in acidic medium at a temperature between about 0° C and 20° C. The enolate (V) need not be isolated. As a matter of fact, it is sufficient to acidify the reaction medium obtained at the end of stage $a_2$ by means of a strong and anhydrous inorganic acid, such as hydrochloric or sulfuric acid, and to add thereto the lower alkanol.

Although, both ways (a) and ($a_2$), ($a_3$) (with or without $a_1$) can be equally used, way ($a_2$), ($a_3$) is preferred since it makes use of cheaper reactants and gives better yields.

After obtainment of the compound (VI) the succession of stages is the following:

stage (b. Action of organo-magnesium compound $CH_3MgX$, X being a halogen, on the compound (VI) converting the latter into a $C_{15}$-pseudo-hydroxyacetal (VII) or 3,7,11-trimethyl 4,6,10-dodecatriene 1,1-lower dialkoxy-2-ol. The $C_{15}$-pseudo-hydroxyacetals (VII) are new compounds.

The Grignard-type reaction leading to these compounds (VII) is conveniently carried out in an ether, as solvent, at a temperature between about −20° C and the reflux temperature of the solvent, preferably between about 0° C and 20° C.

stage c. Hydrolysis of the compound (VII) with a hydrohalic acid, in particular hydrochloric acid, in an acetonic medium, into $C_{15}$-pseudo-aldehyde (VIII) or 3,7,11-trimethyl-2,4,6,10-dodecatetraene-1-al which is a new compound.

This hydrolysis is advantageously effected at a temperature between about 20° C and the reflux temperature of the reaction medium.

stage (d. Condensation of the compound (VIII) with acetone in an alkaline medium giving $C_{18}$-pseudo-ketone (IX) or 6,10,14-trimethyl-3,5,7,9,13-pentadecaene-2-one which is a new compound.

To effect this condensation, the compound (VIII) need not be isolated. It is sufficient to alkalinize the acetonic reaction medium obtained at the end of stage (c) by means of a strong base to carry out the condensation, the useful temperature range being the same as in stage (c). Thus, for all practical purposes, stages c and d are merged into one stage.

stage (e. Catalytic hydrogenation of the compound (IX) in the presence of palladinized charcoal giving saturated $C_{18}$-pseudo-ketone or phytone (X).

This hydrogenation may be effected in any organic solvent which is inert towards hydrogen such as alkanols, saturated aliphatic hydrocarbons and the like. The optimal temperature range is from about 0° C to 30° C and the pressure may vary from atmospheric pressure to 1 atmosphere gauge.

It is clear from the foregoing that applicants' process comprises only a limited number of simple stages, especially if it is noted that stages ($a_2$) and ($a_3$), on the one hand, and stages (c) and (d), on the other hand, can each be merged practically into one stage.

The invention also covers as new industrial products the compounds (VI), (VII), (VIII) and (IX).

It should be mentioned in this respect that the preparation of $C_{15}$-pseudo-aldehyde (VIII) and $C_{18}$-pseudo-ketone (IX) have been described by Barraclough et al. (J. Chem. Soc., 1939, 1549) by condensation of citral with dimethylacroleine followed by crotonization in acetone.

However, the constants of this product are different from those that the Applicants measured from the specimens of (VIII) and (IX) obtained by their process, in particular as concerns the ultraviolet absorption wave length. The Applicants obtained the preparation according to Barraclough and noticed that the catalytic hydrogenation of the alleged ketone (IX) does not give phytone (X) (verification carried out by chromatography).

The following table shows the comparative tests:

Products VIII and Derivatives

| Preparation | VIII | IX | Catalytic hydrogenation of IX |
|---|---|---|---|
| Process of the applicants | $\lambda$ max.=338 m$\mu$ (alcohol)<br>Semicarbazone a: M.P.=158–60° C<br>$\lambda$ max.=335 m$\mu$<br>Semicarbazone b: M.P.=191–93° C<br>$\lambda$ max.=335 m$\mu$ | $\lambda$ max.=368 m$\mu$ | Phytone(X) B.P.$^{0.5}$=120°.<br>Semicarbazone M.P.=69.5–70° C.<br>(M.P.=70–70.5°): Smith & Sprung—J. Amer. Chem. Soc. 1943 65 1285. |
| Barraclough et al. (J. Chem. Soc. 1939 1549). | $\lambda$ max.=315 m$\mu$ (alcohol)<br>Semicarbazone a: M.P.=178–79°<br>$\lambda$ max.=325 m$\mu$<br>Semicarbazone b: M.P.=112°<br>$\lambda$ max.=324 m$\mu$ | $\lambda$ max.=358 m$\mu$ | Not effected. |
| Repeat of Barraclough's work effected by the applicants. | $\lambda$ max.=315 m$\mu$<br>Semicarbazone a: M.P.=176–78°<br>$\lambda$ max.=325 m$\mu$ | $\lambda$ max.=358 m$\mu$ | Complete absence of phytone checked by CPPV and thin layer chromatography. |

Thus, it is clear that Barraclough's products do not correspond to the structure (VIII) and (IX).

The following example illustrates the invention.

EXAMPLE 1. 7,11-dimethyl 4,6,10-dodecatriene-1,1-dimethoxy-3-one or $C_{14}$-pseudo-acetal (VI).

(starting with citral by condensation with acetal of β-ketobutyraldehyde - stage(a)

50 g of citral (II)(or corresponding amount of lemongrass oil), 91 g of dimethylic acetal of β-ketobutyraldehyde (IV) (commercial product), 475 cc of anhydrous methylene chloride are placed in a three-necked flask and a solution of 9 g of sodium methylate in 25 cc of absolute methyl alcohol are added slowly at −10° C. Stirring is continued for 1 hr 30 min. at −10° C. The product is extracted with ether, washed with water and then several times with a solution of dilute sodium hydroxide, once with 5 percent bicarbonate, and then with water until neutrality. The product is dried on sodium sulphate and concentrated under low pressure.

Weight = 109 g
$BP._{0.5} = 115°$ C
$\lambda max. = 295\ m\mu - E_{1cm}^{1\%} = 929$ (isopropanol)

| Analysis: | $C_{16}H_{26}O_3$ | M.W. = 266.38 |
|---|---|---|
| Theoretical % | C 72.14 | H 9.80 |
| Found | 72.05 | 9.94 |
| | 71.99 | 9.76 |

2. 7,11-dimethyl-4,6,10-dodecatriene-1,1-dimethoxy-3-one or $C_{14}$-pseudo-acetal (VI).

(starting with pseudo-ionone - stages ($a_2$) and ($a_3$)

110 g of ethyl formate in solution in 140 cc of hexane are added in 15 min at 19° C to a suspension of 60 g of sodium methoxide in 600 cc of hexane. As soon as the addition has been effected, the product is stirred for 30 min. and 150 g of pseudo-ionone (II) in solution in 300 cc of hexane are added and stirring is continued for 3 hr. 30 min. The enolate thus prepared is added at 0° C to a solution of 75 cc of sulphuric acid in 900 cc of anhydrous methanol. After stirring for 2 hr., the product is poured onto an aqueous solution of iced bicarbonate and extracted with hexane.

Weight = 203 g
$\lambda max. = 295\ m\mu - E_{1cm}^{1\%} = 847$ (isopropanol)

3. 3,7,11-trimethyl-4,6,10-dodecatriene-1,1-dimethoxy-3-ol or $C_{15}$-pseudo-hydroxy-acetal (VII) - stage b -

There is added at 0° C to an organo-magnesium compound prepared in the usual manner from 4.88 g of magnesium in 200 cc of anhydrous tetrahydrofuran (or diethyl ether), within 1 hr. a solution of 40 g of $C_{15}$-pseudo-acetal (VI) in 40 cc of tetrahydrofuran. Stirring is continued for 2 hr. at room temperature. The product is decomposed with a 5 percent hydrochloric acid solution and extracted with ether, dried and concentrated under low pressure.

Weight = 42 g
$BP._1 = 140°$ C
$\lambda max. = 240\ m\mu - E_{1cm}^{1\%} = 925$ (isopropanol)

| Analysis: | $C_{17}H_{30}O_3$ | M.W. = 282.44 |
|---|---|---|
| Theoretical % | C 72.29 | H 10.70 |
| Found | 72.38 | 10.55 |
| | 72.39 | 10.75 |

4. 3,7,11-trimethyl-2,4,6,10-dodeca-tetraene-1-al or $C_{15}$-pseudo-aldehyde (VIII) - stage c -

5 g of $C_{15}$-pseudo-hydroxy-acetal (VII) are put in solution in 37.5 cc of acetone. The solution is heated under reflux and 2 cc of N hydrochloric acid are added.

After 45 min., the absorption maximum has moved to 338 $m\mu$. The product is poured into a cooled 5 percent sodium bicarbonate solution and extracted with ether.

Weight = 3.85 g
$\lambda max. = 338\ m\mu - E_{1cm}^{1\%} = 1045$ (ethanol)
$\lambda max. = 338\ m\mu - E_{1cm}^{1\%} = 1082$ (isopropanol)

Semicarbazone. The semicarbazones a and b are isolated from the mixture of the stereoisomer semicarbazones obtained in the usual manner.

Semicarbazone a:

M.P. = 158°–160° C (crystallized in methanol)
$\lambda max. = 335\ m\mu - E_{1cm}^{1\%} = 2365$ (isopropanol)

| Analysis: | $C_{16}H_{25}ON_3$ | M.W.=275.40 |
|---|---|---|
| Theoretical % | C 69.78 | H 9.15 |
| Found | 69.89 | 9.17 |
| | 70.05 | 9.36 |

Semicarbazone b:

M.P. = 191°–193° C (crystallized in methanol)
$\lambda max. = 335\ m\mu - E_{1cm}^{1\%} = 2490$ (isopropanol)
$\lambda max. = 335\ m\mu - E_{1cm}^{1\%} = 2500$ (ethanol)

| Analysis: | $C_{16}H_{25}ON_3$ | M.W. = 275.40 |
|---|---|---|
| Theoretical % | C 69.78 | H 9.15 |
| Found | 69.91 | 9.47 |
| | 69.73 | 9.04 |

5. 6,10,14-trimethyl-3,5,7,9,13-pentadeca-pentaene-2-one or $C_{18}$-pseudo-ketone (IX) - stage d -

The $C_{15}$-pseudo-aldehyde (VIII) is prepared, as described in the preceding example, from 100 g of $C_{15}$-pseudo-hydroxy-acetal, 750 cc of acetone and 40 cc of N hydrochloric acid.

After refluxing for 25 min., the mixture is cooled and 245 cc of N sodium hydroxide are added. Stirring is continued for 1 hr. at room temperature, the absorption being then 370 $m\mu$. The product is poured into water, neutralized with dilute hydrochloric acid and extracted with ether.

Weight = 89 g
$\lambda max. = 368\ m\mu - E_{1cm}^{1\%} = 1088$ (isopropanol)

6. 6,10,14-trimethyl-2-pentadecanone or saturated $C_{18}$-pseudo-ketone or phytone (I) - stage e -

128.5 g of $C_{18}$-pseudo-ketone (IX) are put in solution at 95° C in 640 cc of ethyl alcohol. 6.42 g of 5 percent palladium on charcoal and hydrogen are added at room temperature under a pressure of 50 cm of water until the absorption of hydrogen stops.

The product is filtered on sintered glass and concentrated.

Weight = 125 g
$BP._{0.5} = 120°$ C
$n_D^{20} = 1.448$

Semicarbazone - (White flakes in methanol).

M.P. = 69.5°–70° C (Smith and Sprung, J.Amer. Chem. Soc.1943 65 1285 indicate MP = 70°–70.5° C).

| Analysis: | $C_{19}H_{39}ON_3$ | M.W. = 325.54 |
|---|---|---|
| Theoretical % N | 12.90 | |
| Found | 12.46 | |
| | 12.48. | |

It must be understood that the invention is not intended to be limited by the modes of carrying out the invention described hereinbefore which have been given merely by way of examples.

Having now described our invention what we claim as new and desire to secure by Letters Patent is:

1. Process for preparing phytone comprising the following series of reactions:

a. conversion of pseudo-ionone into $C_{14}$-pseudo-acetal: 7,11-dimethyl-4,6,10-dodecatriene-1,1-lower dialkoxy-3-one by formylation of pseudo-ionone followed by the acetalization of the enolate obtained as a result of this formylation, said formylation being effected at a temperature between about 0° C and 30° C in an anhydrous medium by means of a lower alkanol formate in the presence of an alkali alkoxide of a lower alkanol and said acetalization being effected by acidifying, with a strong and anhydrous inorganic acid, the reaction medium of the formylation step and adding thereto a lower alkanol;

b. treatment of the $C_{14}$-pseudo-acetal with the organomagnesium compound $CH_3 MgX$, X being a halogen, in an ether at a temperature between about −20° C and the reflux temperature, converting it into $C_{15}$-pseudo-hydroxyacetal: 3,7,11-trimethyl-4,6,10-dodecatriene-1,1-lower dialkoxy-3-ol;

c. hydrolysis of the $C_{15}$-pseudo-hydroxyacetal by maintaining a solution thereof in acetone containing a hydrohalic acid at a temperature between about 20° C and the reflux temperature, thus converting said acetal into $C_{15}$-pseudo-aldehyde: 3,7,11-trimethyl-2,4,6,10-dodecatriene-1-al;

d. condensation of the $C_{15}$-pseudo-aldehyde with acetone by alkalinizing the reaction medium of the hydrolysis step, thus obtaining $C_{18}$-pseudo-ketone: 6,10,14-trimethyl-3,5,7,9,13-pentadecaene-2-one, and e. catalytic hydrogenation of the $C_{18}$-pseudo-ketone into phytone, using palladinized charcoal as catalyst.

2. 6,10,14-trimethyl-3,5,7,9,13-pentadecaene-2-one.

* * * * *

UNITED STATES PATENT OFFICE
CERTIFICATE OF CORRECTION

Patent No. __3,676,499__  Dated __July 11, 1972__

Inventor(s) __Joseph Redel, et. al.__

It is certified that error appears in the above-identified patent and that said Letters Patent are hereby corrected as shown below:

On the cover sheet [30], "64986944" should read -- 986994 -- .

Signed and sealed this 15th day of May 1973.

(SEAL)
Attest:

EDWARD M. FLETCHER, JR.
Attesting Officer

ROBERT GOTTSCHALK
Commissioner of Patents